Figure 1:
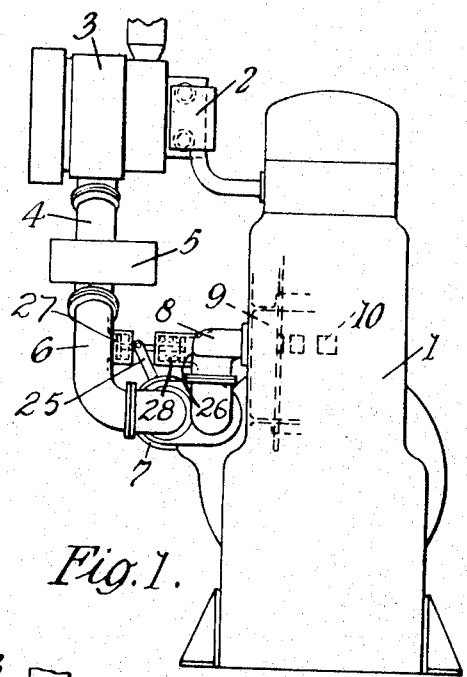

Dec. 5, 1967  J. J. S. SMITH ETAL  3,355,879
TURBOCHARGED TWO-STROKE CYCLE INTERNAL COMBUSTION ENGINES
Original Filed June 22, 1964  3 Sheets-Sheet 1

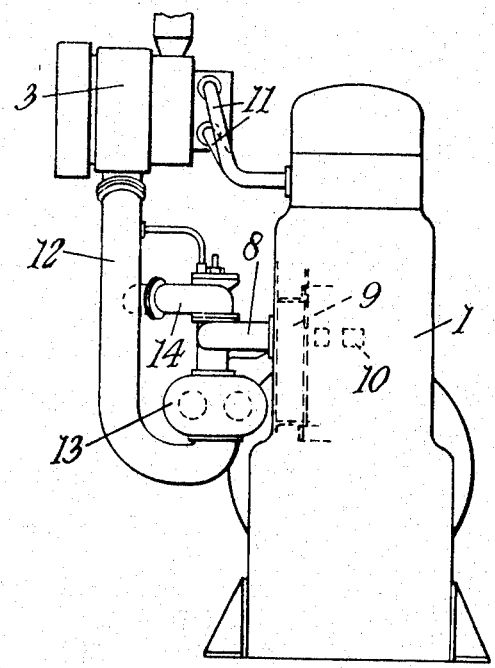
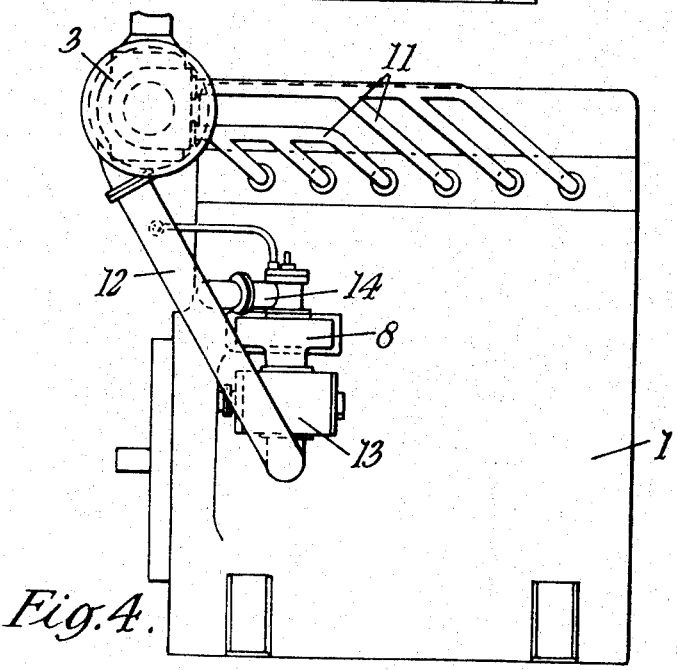

Dec. 5, 1967  J. J. S. SMITH ETAL  3,355,879
TURBOCHARGED TWO-STROKE CYCLE INTERNAL COMBUSTION ENGINES
Original Filed June 22, 1964  3 Sheets-Sheet 3
FIG. 5.
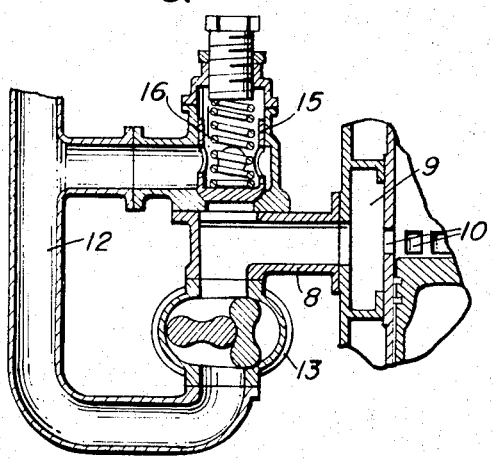
FIG. 6.
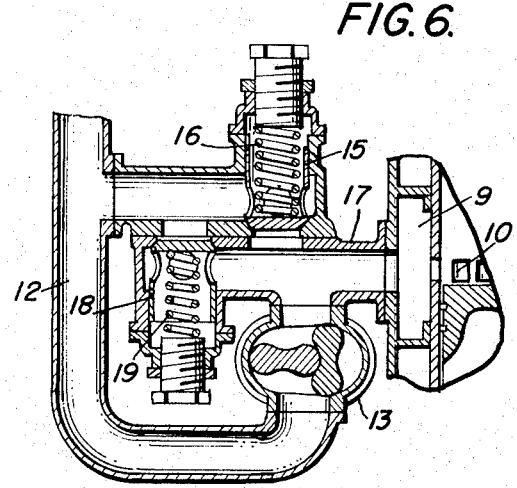
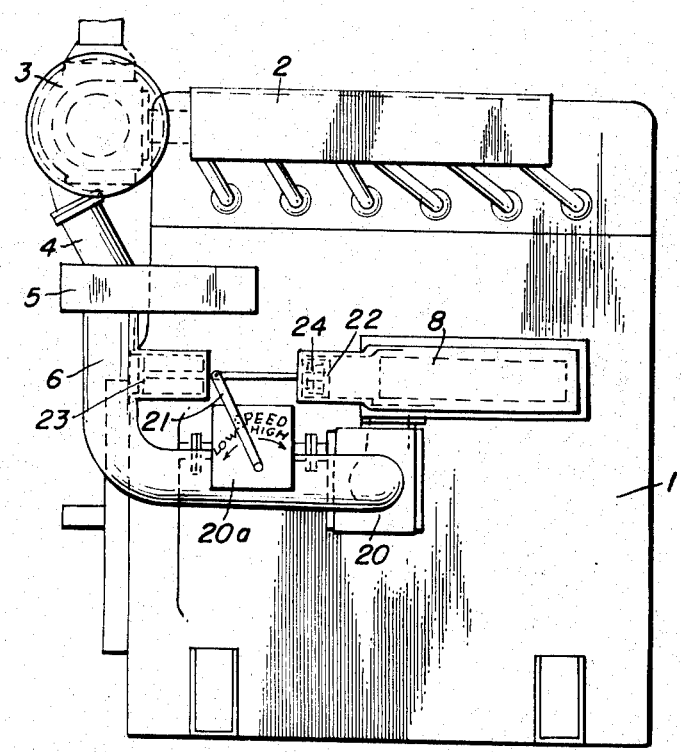
FIG. 7.
INVENTORS
JAMES JOHN STEWART SMITH
DONALD WILFRED TRYHORN United States Patent Office 3,355,879
Patented Dec. 5, 1967

3,355,879
TURBOCHARGED TWO-STROKE CYCLE
INTERNAL COMBUSTION ENGINES
James John Stewart Smith and Donald Wilfred Tryhorn, Slough, England, assignors to Sir W. G. Armstrong & Company (Engineers) Limited, London, England
Continuation of application Ser. No. 376,890, June 22, 1964. This application Sept. 16, 1966, Ser. No. 580,128
Claims priority, application Great Britain, July 4, 1963, 26,586/63
6 Claims. (Cl. 60—13)

This application is a continuation of our prior application, Ser. No. 376,890, filed June 22, 1964, now abandoned.

The invention relates to turbocharged internal combustion engines, of the type having exhaust gas driven turbocharger, and engine driven compressor means while the object of the invention is to provide a turbocharged internal combustion engine of improved efficiency.

The arrangement of the engine with exhaust gas driven turbocharger and engine driven compressor is most frequently used on two-stroke cycle engines and this type will be referred to for explanation of the invention, although the system can be applied to other engines such as the four-stroke cycle type.

Two known forms of two-stroke cycle internal combustion engines in which the exhaust gases are utilized to drive a turbocharger compressor or compressors for the supercharging medium are firstly what is known as a "series turbocharged engine" in which, the supercharging medium is supplied to the air chest of the engine from the turbocharger via a compressor driven by the engine, either directly or by way of an inter-cooler, and a "simple turbocharged engine" in which the supercharging medium is passed from the turbocharger either direct to the air chest of the engine or via an intercooler.

Both these known engines have their own particular commendable features and it is a further object of the present invention to provide a "series turbocharged engine" having in addition some of the advantages of the "simple turbocharged engine."

The working conditions of turbochargers are limited in range by turbine speed, exhaust gas temperatures and compressor surge or choking. Within these limits the operating conditions have an appreciable effect on turbocharger efficiency and a turbocharger can only be designed to give its optimum efficiency over limited range of conditions. If, therefore, a turbocharger is designed to supply at its maximum efficiency a given density of air for a specific engine power output, an increase or decrease in that output will naturally effect the turbocharger efficiency and bring about conditions nearer to one of the limits of operation. When optimum efficient matching conditions between engine and turbocharger have been arrived at, an increase in engine power output brings about an increase in exhaust energy and results in an increase in turbine speed and also an increase in the turbocharger delivery pressure.

In a "simple turbocharged engine" of variable speed the engine air flow requirements for acceleration from medium speed and load to maximum speed and load can be provided by a suitably matched turbocharger but below medium loads and speeds the engine is slow to react to increased fuel supply when the turbocharger has been matched for the upper output range of the engine. Further, the engine must have air for starting and acceleration from idling and for these reasons the "series turbocharged engine" is preferred in almost all engines of variable speed type.

In a "series turbocharged engine" of variable speed the engine air flow requirements can be efficiently matched for changing load at any one speed, but cannot be efficiently matched for changes of load over a wide range of speeds. The engine driven compressor of the "series turbocharged engine" is generally of the Roots type but may be a piston pump or other known type. The system of the "series turbocharged engine" although favoured for variable speed engines, is far from ideal, since a system matched to give the air requirements of an efficient engine at optimum speed will provide too much air and overload the engine driven blower at high engine speeds.

To enable high engine speeds to be reached it has been known for a blow off valve to be incorporated in the system. This valve is set to open at a predetermined air chest pressure which is generally determined by the acceptable peak cylinder pressure and which allows the air from between the delivery side of the engine driven blower and the engine air ports to recirculate back to the ducting connecting the turbocharger and the inlet to the engine driven blower. This valve arrangement, will be referred to as the "known kind" and allows higher engine outputs to be reached before the limiting turbocharger speed is reached, but, as will now be explained, this valve is inefficient and costly in fuel consumption.

When a turbocharger is matched to give a high torque at speeds below the maximum speed, then the greater this speed difference, the greater become the pressures in the system at the higher speeds and these pressures can and do become excessive for economical running. If the "series turbocharged engine" with known recirculating valve set to open at a chosen air chest pressure, is matched for efficient working at a given low engine speed, an increase of engine power output at this speed produces a rise in turbocharger and engine driven blower delivery pressures to suit the required load with the pressure differences between the two varying slightly, but for the same change in power outputs by increase of speed the turbocharger delivery pressure unnecessarily increases to a similar extent, while that of the engine driven blower unnecessarily increases to a greater amount. This occurs to such an extent that at high speed of the engine the turbocharger can be working near its maximum output at loads less than could be reached with the engine driven blower alone.

A further undesirable feature is that the power required to drive the engine driven blower rapidly becomes excessive with the increasing pressure rise through the blower, and this at great cost to the engine's fuel economy, since at increased speed it passes more air than is necessary to sustain engine power.

A further object of the present invention therefore is to provide a "series turbocharged engine" in which the air supply to the engine air chest is so controlled, as to prevent an excessive and unnecessary build up in the differential pressure between the inlet and delivery side of the engine driven blower.

The invention consists in an internal combustion engine the exhaust gases of which are utilised to operate an exhaust gas turbine which drives a compressor for the engine supercharging medium and in which such medium passes to the engine by way of an engine driven compressor, characterised in that means is provided for preventing difference in pressure between the inlet to and outlet from the engine driven compressor from rising above a predetermined value.

The invention further consists in an internal combustion engine as set forth in the preceding paragraph in which the engine is a two-stroke cycle internal combustion engine.

The invention still further consists in an internal combustion engine as set forth above, in which the pressure difference between the inlet to and outlet from the engine driven compressor is prevented from rising above the said predetermined value by reason of the engine driven compressor being of the variable displacement type with the displacement controlled by an automatic device to follow the characteristics of or near to that of a constant difference in pressure across it. Such variable displacement devices are seen in U.S. Patents No. 953,539 and No. 3,088,659.

The invention still further consists in an internal combustion engine as set forth above, in which the pressure difference between the inlet to and outlet from the engine driven compressor is prevented from rising above said predetermined value by reason of the compressor being driven from the engine by a variable speed device by which the displacement of the compressor is arranged to decrease with increase of engine speed.

The means to vary the speed of the compressor with respect to the engine speed operates to change the displacement of the compressor with respect to the engine speed, and therefore constitutes a means to vary the throughput of the engine driven compressor and, taken with the pistons 22, 23 by which the means to vary the speed is controlled through a lever, constitutes fluid pressure operated means to limit the air pressure difference between the intake and discharge of the compressor.

The invention still further consists in an internal combustion engine as set forth above, in which the pressure difference across the engine driven compressor is prevented from rising above the said predetermined value by reason of the fitting of an air recirculation device which is acted upon by the pressure at both sides of the said compressor and which recirculates air from the delivery side to the inlet side at a predetermined pressure difference.

The invention still further consists in an internal combustion engine as set forth in the preceding paragraph in which the engine driven compressor is of the constant displacement kind.

The invention also consists in an internal combustion engine as set forth above which is provided in addition with a valve means, which circulates air from the inlet side of the compressor to the delivery side thereof when the pressure at the inlet side is higher than that at the delivery side.

The engine driven positive displacement compressor of the variable displacement type, referred to above and throughout this specification, can conveniently be a variable throughput compressor of the kind described and claimed in the specification of British Patent No. 665,484. Alternatively, the same result may be achieved by using an engine driven compressor not of the variable throughput type such as a Roots blower and fitting it with an air recirculation device in accordance with the invention in which by recirculating the air from the delivery of the compressor to the inlet varies the quantity of fresh charge taken in by the compressor. A still further alternative arrangement is to provide a compressor driven from the engine by a variable speed device by which the throughput from the compressor decreases as the difference in pressure between the inlet to and outlet from the engine driven compressor rises above a predetermined level.

The variable throughput machine or the recirculation system may be controlled by any known means, such as a linkage from the engine speed and power controls, and following a set programme by the action of cams etc., however, in a preferred form they are controlled by the difference in pressure between the inlet and delivery of the compressor. Tests have shown that a very good engine performance can be obtained when this difference in pressure is controlled not to exceed a predetermined figure (in the practical case this was 3 p.s.i.g.), however the actual law of change of pressure difference with operating conditions is not highly critical, for example, it is acceptable to have the air chest pressure not exceeding the absolute turbocharger delivery pressure times a factor which would lie within the range between 1.01 and 1.3. Different laws of control, which will best suit different engines and applications can be obtained by pressure control devices such as piston valves having differential piston areas and working against variable or constant rate springs.

Use of the proposed system enables the turbocharger to operate such that the increase in air delivered to the engine at constant horse-power for a large increase of speed varies to a lesser extent than for the known series system, but more than for the simple turbocharged system.

Figure 2:
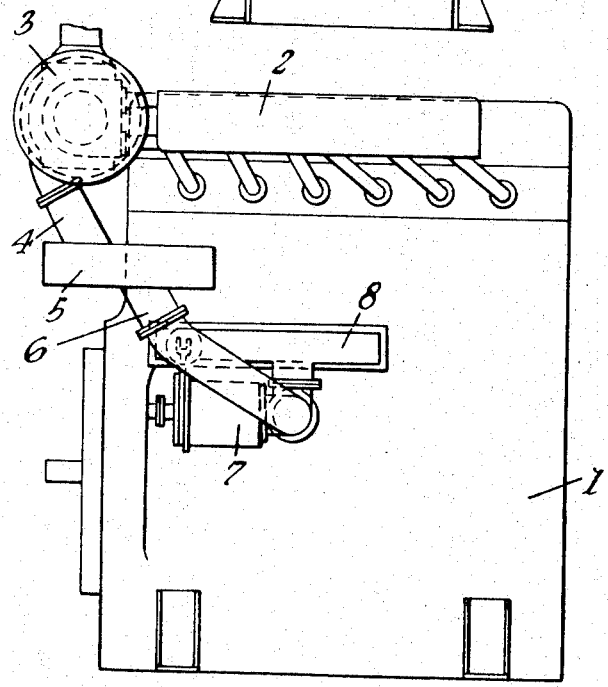

The accompanying drawings show, by way of example only, two embodiments of the invention in which:

FIGURE 1 shows in end elevation an engine constructed in accordance with the invention having an engine driven positive displacement compressor the displacement of which decreases as the difference in pressure between the inlet to and the outlet from the engine driven compressor rises above a predetermined value, FIGURE 2 is a side elevation of the engine of FIGURE 1, FIGURE 3 is an end elevation of a further engine constructed in accordance with the invention having an engine driven positive displacement compressor of the constant displacement type with a recirculating valve, FIGURE 4 is a side elevation of the engine of FIGURE 3, FIGURE 5 is an enlarged view of the recirculating valve comparable to that of FIGURES 3 and 4, but avoiding the use of a pipe for the valve backing pressure, FIGURE 6 is an enlarged view of the recirculating valve means and by-pass means, while FIGURE 7 is a view similar to FIGURE 1 in which a speed varying means is shown.

The engine, shown in FIGURES 1 and 2, is of the two-stroke cycle type. The outflowing exhaust gases are led from the engine's exhaust valve means through a capacity type exhaust manifold 2, although any normal type would do, to an exhaust driven turbocharger 3, before exhausting to atmosphere. The air charge from the exhaust driven compressor is led through ducting 4, and air charge cooler 5, although a cooler is not essential, and the ducting 6 to an engine driven positive displacement compressor 7, of the variable throughput type, the capacity of which decreases as the pressure rise from the inlet to the outlet increases above a predetermined value, and thence through ducting 8, to the air capacity chamber 9, surrounding the cylinder air ports 10.

To control the operation of the compressor 7, discussed above, a lever 25 is shown that is connected at the lower end to the control shaft of the compressor 7, and at the other end to the piston means 26, 27. It will be noted that piston 26 has a face opposed to the pressure in ducting 8 and the piston 27 has a face opposed to the pressure in ducting 6. A spring 28 biases the piston means 26, 27 toward ducting 8 so that it will require a pressure in ducting 8 above the pressure in ducting 6 to move the pistons 26, 27 to the left in FIGURE 1 to decrease the throughput of compressor 7.

The engine arrangement shown in FIGURES 3 and 4 is similar to that of FIGURES 1 and 2 and in this embodiment of the invention the exhaust gases are led from the engine's exhaust valve means through manifolds 11, to exhaust driven turbocharger 3, before exhausting to atmosphere. The air from the exhaust driven compressor is led through ducting 12 direct to an engine driven positive displacement compressor 13 of the constant displacement type, while a recirculation valve arrangement 14 is provided which connects the air chest 9 by way of the ducting 8, with the inlet side of the compressor at a predetermined pressure difference and recirculates air from the delivery side of the positive displacement compressor to the inlet side thereof. Where an air charge cooler is incorporated between the exhaust driven compressor and the engine driven compressor, the air on the inlet side of the engine driven compressor which pressurises the recirculating valve on that same side may be taken from the inlet or outlet side of the air charge cooler with the recirculating air being returned to the inlet or outlet side of the air charge cooler.

The valve arrangement as shown in FIGURE 5 is a sectional enlargement of a recirculating valve and when the pressure in ducting 8 exceeds by a predetermined amount the pressure in ducting 12, valve 15 opens against the set load of compression spring 16 and allows air to recirculate from the delivery side to the inlet side.

The valve arrangement as shown in FIGURE 6 shows in addition to the valve means described for FIGURE 5 a valve 18, which, when the pressures in ductings 12 and 17 are balanced is maintained in a closed position by a lightly loaded compression spring 19, but which will open when the pressure in ducting 12 should exceed the low pressure difference allowed for by spring 19 thus allowing air from the inlet side to by-pass the positive displacement compressor and pass direct to ducting 17.

In the alternative arrangement shown in FIGURE 7, the compressor 7 is replaced by a compressor 20 which may be a common root type compressor, or other positive displacement compressor, driven through a variable speed gear box 20*a*. The drive ratio of this gear box is controlled by the position of lever 21 in response to the movement of pistons 22, 23 which are biased by a spring 24, in the same manner as pistons 26, 27 are biased by spring 28 in FIGURE 1. It will be seen in FIGURE 7 that as the pressure difference between the ducting 8 and the ducting 6 varies, the pistons 22, 23 will move to the left to slow down the speed of the compressor with respect to the speed of the engine if the pressure in ducting 8 exceeds the pressure in ducting 6 by the amount determined by the strength of the spring 24. The pressure differential, as noted above, that gave a very good performance would require a spring 24 of a strength that would yield under a pressure differential of about 3 p.s.i.g.

In the invention as it applies to the two-stroke cycle "series turbocharged engine" the general arrangement of the engine may be substantially in accordance with any known type in which the fresh charge is provided by a compressor driven by an exhaust gas turbine running in series with engine driven compressor. The normal arrangements for conveying the fresh charge from the turbo compressor to the air chest surrounding the cylinders may be employed and may or may not incorporate an air charge cooler.

If the engine, shown in FIGURES 3 and 4, is provided, in place of the recirculating valve arrangement 14, with a recirculating valve of the known kind, then, for a given engine speed the turbocharger can be matched for peak efficiency over the load range. With an increase in speed it will still function but under less favourable conditions of efficiency and nearer to its choking and speed limits of operations. Because under these conditions the turbocharger is supplying more air than the engine requires for the load applied so the turbine inlet temperature is low and this coupled with the low efficiency of the turbocharger causes the engine driven blower to have to do excessive work to pass its normal throughput of air. This work increases the losses and so lowers the efficiency of the engine, and can overload the engine driven blower and its drive.

Considering now the engine as shown in FIGURES 3 and 4, where the recirculating valve arrangement 14 is of the type which satisfies the conditions of the invention and also the engine as shown in FIGURES 1 and 2 where there is no recirculation valve but where the engine driven positive displacement compressor of constant displacement is replaced by one the displacement of which decreases as the difference in pressure between the inlet to and the outlet from the engine driven compressor rises above a predetermined level, or where there is again no recirculating valve, but where the engine driven compressor is driven from the engine by a variable speed device by which the total throughput of the compressor is arranged to decrease with increase of engine speed to satisfy the invention, then again for the same engine with the same optimum matched turbocharger condition as described for the engines with recirculating valve, the engine's requirements for load change is still the same good match. For the same increase in speed, however, the turbocharger will not be caused to work under low efficiency conditions close to its limits of speed and choking. The schemes described are all methods of reducing the effective throughput of the engine driven compressor, namely (1) using an engine driven compressor of the variable throughput type, that is one which when running at constant speed has a control device which alters the throughput. (2) Using a fixed displacement engine driven blower and fitting a recirculating valve by which the air recirculated reduces the effective throughput of the blower. This condition is normally associated with positive displacement blowers or compressors but aerodynamic types can give similar characteristics when working near the choking condition. (3) Using a blower or compressor driven through a variable speed device. Many forms of variable speed drive exist and would be suitable particularly those having a lever or shaft for control of the speed ratio, although an automatic change of speed by centrifugal forces would also suit this application.

It should be appreciated from the foregoing description that there are a number of forms of construction which may be used to limit the difference in pressure between the inlet to and the outlet from the engine driven compressor, and that the embodiments described are by way of example only. However, the use of a differential pressure controlled by-pass valve as shown in FIGURES 5 and 6 is preferred because it gives the desired conditions of operation without major design change from existing engine types.

At high loads it is possible with series charged engines for the delivery volume of the turbocharger to be greater than the displacement of the engine driven blower and under these conditions the blower restricts the free flow of air through the engine to less than that given by a turbocharged engine not having an engine driven blower. Also on shut down the engine driven blower stops the free circulation of air through the turbine and so cause overheating of the turbine and surge of the turbocharger compressor. These bad features are eliminated by use of a two way recirculating valve as shown in FIGURE 6 in which in addition to the recirculating valve 15 a lightly loaded valve 18 is used to control flow in the reverse direction. This valve opens whenever the pressure in duct 12 is higher than that in the air chest 9. With two-stroke cycle engines having four or more cylinders there are always ports open and so a through passage between the air chest and the turbocharger when the engine is stationary, so that air keeps flowing after the engine has stopped.

It is to be understood that the above description is by way of example only, and that details for carrying the invention into effect may be varied without departing from the scope of the invention.

What is claimed is:

1. In a variable speed compression ignition engine of the type having an intake manifold and exhaust and in which exhaust gases from the engine operate a turbine, a supercharging blower driven by said turbine, a positive displacement engine driven compressor, conduit means leading from said supercharging blower to the intake of said compressor, further conduit means leading from the discharge of said compressor to the manifold of said engine to normally supply air to said manifold at a pressure higher than that supplied by said supercharging blower, the improvement comprising fluid pressure responsive means operatively associated with the intake to and discharge from said engine driven compressor to limit the effective throughput capacity and thereby the pressure difference between said intake to and discharge from said compressor whereby the pressure at the discharge cannot exceed the pressure at the intake of said compressor by more than a predetermined amount.

2. The variable speed compression ignition engine as claimed in claim 1 including a variable speed means by which said engine drives said compressor, and said fluid pressure responsive means being operatively connected to said variable speed means to adjust the speed thereof so that the speed of said compressor is reduced if the pressure at said compressor discharge exceeds the pressure at said compressor intake by more than the predetermined amount.

3. The variable speed compressor ignition engine as claimed in claim 1 including means to adjust the volumetric throughput of said engine driven compressor with respect to the engine speed, and said fluid pressure responsive means being operatively connected to said last-mentioned means to adjust the throughput of said compressor so that the throughput of said compressor is reduced if the pressure at said discharge from said compressor exceeds the pressure at said compressor intake by more than the predetermined amount.

4. In a variable speed compression ignition engine of the type having an intake manifold and exhaust and in which exhaust gases from the engine operate a turbine, a supercharging blower driven by said turbine, a positive displacement engine driven compressor, conduit means leading from said supercharging blower to the intake of said compressor, further conduit means leading from the discharge of said compressor to the manifold of said engine to normally supply air to said manifold at a pressure higher than that supplied by said supercharging blower, the improvement comprising fluid pressure responsive means operatively associated with the intake to and discharge from said engine driven compressor to limit the pressure difference between said intake to and discharge from said compressor.

5. The variable speed compression ignition engine as claimed in claim 4 in which said fluid pressure responsive means includes additional conduit means providing communication between the discharge and intake of said compressor, a valve in said additional conduit means, means normally biasing said valve to close said additional conduit means, and said valve being adapted to open when the pressure in the discharge side of said compressor exceeds the pressure in the intake side of said compressor.

6. The variable speed compression ignition engine as claimed in claim 5 and also including still further conduit means bypassing said valve, a second valve in said still further conduit means, means normally biasing said second valve to close said still further conduit means, and said second valve being adapted to open when the pressure in the intake side of said compressor exceeds the pressure at the discharge side of said compressor.

References Cited
UNITED STATES PATENTS

| | | | |
|---|---|---|---|
| 1,803,660 | 5/1931 | Swartwout | 230—22 |
| 1,955,620 | 4/1934 | Buchi | 60—13 |
| 2,311,936 | 2/1943 | Elfes et al. | 123—119 |
| 2,383,979 | 9/1945 | Lysholm | 60—13 |
| 2,393,852 | 1/1946 | Yingling. | |
| 2,444,952 | 7/1948 | Paget | 230—22 X |
| 2,551,307 | 5/1951 | Yingling | 60—13 |
| 2,562,742 | 7/1951 | Rowe et al. | 60—13 |
| 2,724,340 | 11/1955 | Tryhorn | 103—120 |

LAURENCE M. GOODRIDGE, *Primary Examiner.*